(12) United States Patent
Tuttle

(10) Patent No.: US 12,103,736 B2
(45) Date of Patent: Oct. 1, 2024

(54) SYSTEM AND METHOD FOR ACCESSORIZING A CONTAINER

(71) Applicant: Cassidy Tuttle, Gilbert, AZ (US)

(72) Inventor: Cassidy Tuttle, Gilbert, AZ (US)

( * ) Notice: Subject to any disclaimer, the term of this patent is extended or adjusted under 35 U.S.C. 154(b) by 167 days.

(21) Appl. No.: 17/404,507

(22) Filed: Aug. 17, 2021

(65) Prior Publication Data

US 2023/0053591 A1 Feb. 23, 2023

(51) Int. Cl.
*B65D 25/20* (2006.01)
*A01G 9/02* (2018.01)
*B65D 21/02* (2006.01)

(52) U.S. Cl.
CPC ........... *B65D 25/205* (2013.01); *A01G 9/027* (2013.01); *B65D 21/0204* (2013.01); *B65D 2203/00* (2013.01)

(58) Field of Classification Search
CPC . A01G 9/02; A01G 9/00; A01G 9/027; B65D 2203/00; A63F 9/093; A63F 9/0666; A63F 2009/0095
USPC .......................................................... 434/259
See application file for complete search history.

(56) References Cited

U.S. PATENT DOCUMENTS

| 4,003,144 | A | * | 1/1977 | Maddestra | A63H 33/088 |
| | | | | | 446/122 |
| 5,116,052 | A | * | 5/1992 | Pop | A63F 9/0842 |
| | | | | | 273/153 R |
| 5,306,198 | A | * | 4/1994 | Forman | A63H 33/10 |
| | | | | | 446/124 |
| 5,554,062 | A | * | 9/1996 | Goldsen | A63F 9/0098 |
| | | | | | 446/124 |
| 2005/0155287 | A1 | * | 7/2005 | Phillips | A01G 9/02 |
| | | | | | 47/32.7 |
| 2012/0117870 | A1 | * | 5/2012 | Ness | A47G 7/08 |
| | | | | | 47/65.7 |
| 2018/0110193 | A1 | * | 4/2018 | Marmolejo | A01G 9/02 |
| 2020/0128768 | A1 | * | 4/2020 | Ho | A01G 27/04 |
| 2020/0247584 | A1 | * | 8/2020 | Stegmann | B65D 25/005 |

FOREIGN PATENT DOCUMENTS

FR 1265622 A * 6/1961
WO WO-9303806 A1 * 3/1993 ........... A63F 9/0666

* cited by examiner

*Primary Examiner* — Kristen C Hayes

(57) ABSTRACT

A container and accessory system comprising a bottom, at least one wall, and at least one accessory. The exterior of the wall is comprised of a plurality of holes. The accessory has a face and a peg which is configured to be insertable into the holes to allow the accessory to be removably attached to the container. This allows accessories to be attached to and removed from the container without disturbing the contents of the container.

18 Claims, 5 Drawing Sheets

SYSTEM AND METHOD FOR ACCESSORIZING A CONTAINER

TECHNICAL FIELD

The present specification relates to a container, more particularly container and accessory system for plants or organizing.

BACKGROUND

Potted plants have become a popular plant choice for people due to the ease of growing and maintaining and the ability to place them in a home or office. As a person becomes more involved in and attached to their plants, the desire to interact with and personalize their potten garden grows. One way people interact with their potted plants is to add stakes. These are often changed for special occasions, seasons, and holidays. The stakes can show personality and be very visually appealing, but they can also disturb roots and cause damage to the plant especially when changed with any frequency. Another way people interact with their potted plants is to add rocks or other items on top of the soil. These do not disturb the soil or root structures but can damage the leaves and stems if the pot is moved or bumped.

It would be advantageous to provide a way of personalizing and interacting with potted plants that will not damage the plant.

SUMMARY

Aspects disclosed herein comprise a system and method for accessorizing a container that allows a user to personalize, label, and interact with a container without damaging the container or its contents. A container and accessory system is provided in which the container has at least one wall defined by an interior surface and an exterior surface, and the exterior surface has at least one hole in it. An attachable accessory has a face and at least one peg that is sized to connect to the container by fitting into the hole in the wall of the container.

The wall of the container may be solid or may have a hollow structure defined by the interior surface and the exterior surface of the wall. The peg may have an outer diameter that is substantially the same diameter as the inner surface of the holes so that friction can secure the accessory to the container when the peg is inserted into the hole. The accessory may have one peg to fit into one hole or may have multiple pegs that are configured to fit into multiple holes in the surface of the wall of the container. In some embodiments, the peg may have a shaft portion with a diameter that is the same diameter as the inner surface of the hole or smaller and a lip portion that is slightly larger than the diameter of the hole and compressible such that the lip may be compressed to fit within the hole when inserted by a user. The wall can be substantially hollow so that the lip can decompress once the lip is past the exterior surface of the wall.

In one or more embodiments, the wall is substantially solid between the interior surface and the exterior surface, and the hole has an inner surface that is substantially the same diameter as the peg and extends at least partially into the wall. The interior surface of the wall may be substantially solid to prevent the contents of the container from leaking or spilling out of the container. The container may be a box, a plant pot, or a tank or aquarium or the like. In some embodiments, the container has at least one drain.

The plurality of holes may be arranged in a pattern that is practical or decorative. The pattern can have an outer perimeter, and the outer perimeter can have a desired shape, such as a heart, a smiley face, or a facsimile of the contents of the container. The shape of the holes and the pegs can be circular, triangular, square, hexagonal, octagonal, dodecagonal or a slit or tab. The holes may extend partially into the wall or through the exterior and interior surface of the wall. In the case of a plant pot or other embodiments, the container may have a soil line, and the plurality of holes extend only above the soil line.

The face of the accessory may be decorative or the accessory may comprise a decorative layer that can be adhered to the face of the accessory. A sticker or label may be adhered to the face. The sticker or label may be shaped to conform to the three-dimensional shape of the face or may be shaped to adhere to a flat face surface. The sticker or label may be a design that can be written or drawn upon. The accessory may comprise a plant nutrient that can be provided to a plant on the interior of the container.

The accessory of the system may also be another container, such that the pegs extend from the exterior surface of one container and are configured to be inserted into the holes on the exterior surface of another container. In these embodiments, the container having one or more pegs would be considered the face of the accessory. Multiple containers may be attached to each other to form a structure of connected containers.

A method is also provided in which a container having a bottom and at least one wall defined by an interior surface and an exterior surface, has at least one hole formed in the exterior of the wall. An attachable accessory is provided having a face and at least one peg, and the peg is sized to be insertable into the hole on the exterior of the wall. The accessory may be decorative or may be another container.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the. Absent such clear statements of intent to apply a "special" definition, it is the inventor's intent and desire that the simple, plain, and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35

U.S.C. § 112 (f) are sought to be invoked to define the inventions, the claims will specifically and expressly state the exact phrases "means for" or "step for", and will also recite the word "function" (i.e., will state "means for performing the function of molding a fishing lure, without also reciting in such phrases any structure, material or act in support of the function. Thus, even when the claims recite a "means for performing the function of molding a fishing lure, step for performing the function of molding a fishing lure," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

Additional features and advantages of the present specification will become apparent to those skilled in the art upon consideration of the following detailed description of the illustrative embodiment exemplifying the best mode of carrying out the invention as presently perceived.

BRIEF DESCRIPTION OF THE DRAWINGS

These and other features, aspects, and advantages of the present specification will become better understood with regard to the following description, appended claims, and accompanying drawings where:

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1:
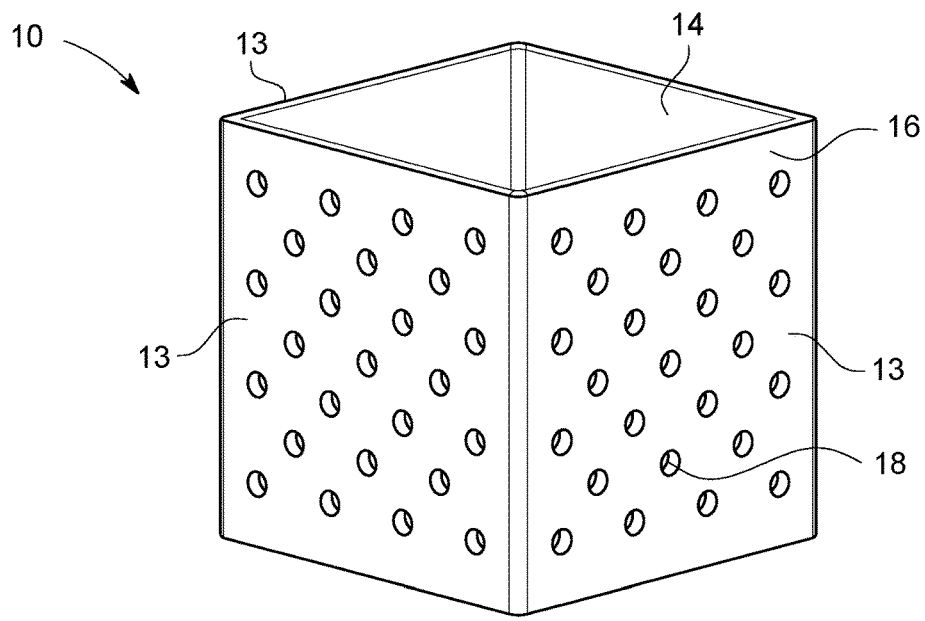
FIG. 1 is a perspective view of a container in accordance with one or more embodiments of the invention.

Referring to FIG. 1 an isometric view of an embodiment of a container 10 for a container and accessory system is shown generally at 10. The container comprises at least one wall 13 defined by an interior surface 14 and an exterior surface 16. The exterior surface can be comprised of a plurality of holes 18.

Figure 2A:
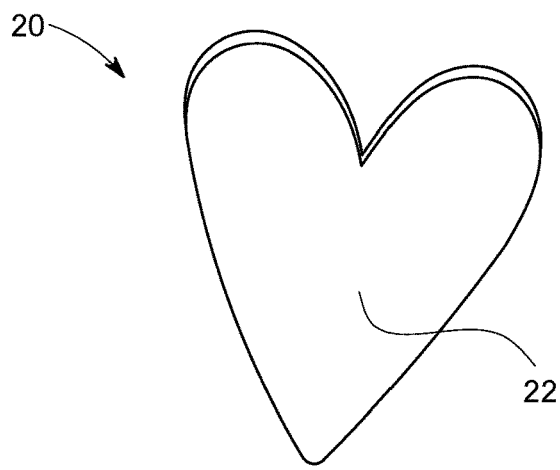
FIG. 2a is a front view of an accessory in accordance with one or more embodiments of the invention.
Figure 2B:
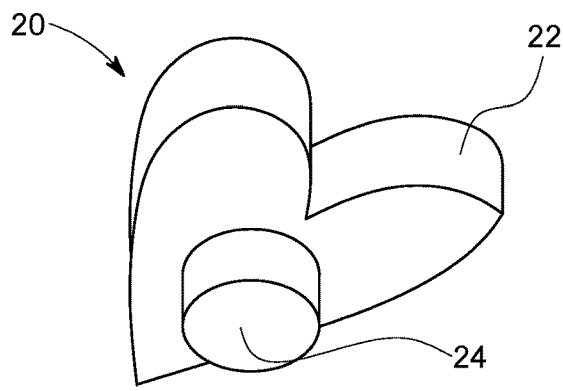
FIG. 2b is a perspective view of an accessory in accordance with one or more embodiments of the invention.

The container and accessory system also include an accessory as shown in FIG. 2a-2b and shown generally at 20. The accessory is comprised of a top or face 22 and a peg 24. The peg 24 of the accessory 20 and the holes 18 of the container 10 are configured such that the peg 24 is insertable into the hole 18 to allow the accessory 20 to be removably attached to the container 10. This allows for an accessory 20 to be changed without damaging or disturbing anything in the container 10, such as a plant.

Figure 3A:
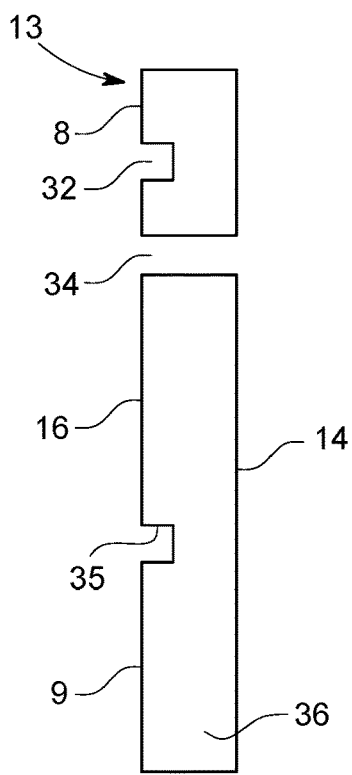
FIG. 3a is a cutaway view of a solid wall of a container in accordance with one or more embodiments of the invention.
Figure 3B:
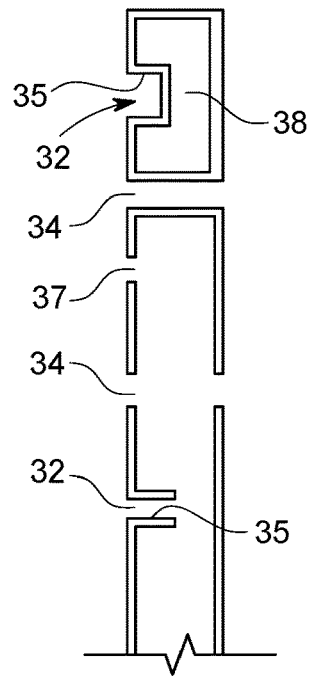
FIG. 3b is a cutaway view of a hollow wall of a container in accordance with one or more embodiments of the invention.

Referring now to FIGS. 3a and 3b, The holes 18 extend at least partially into the wall 13. In one or more embodiments the hole can be a partial hole 32, or it can be a through hole 34. In one or more embodiments the wall exterior surface 16 can comprise a combination of partial holes 32 and through holes 34. The wall 13 can have varying densities, such as solid, hollow, baffled, or the like. FIG. 3a shows the wall 13 as a solid wall 36. FIG. 3b shows the wall 13 as a hollow wall 38. The hole 18 can have an inner surface 35, or it can have no inner surface 37.

Figure 4A:
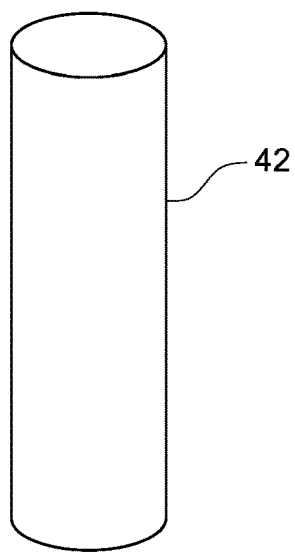
FIGS. 4a and 4b are side views of alternative forms of the peg of an accessory in accordance with embodiments of the invention.
Figure 4B:
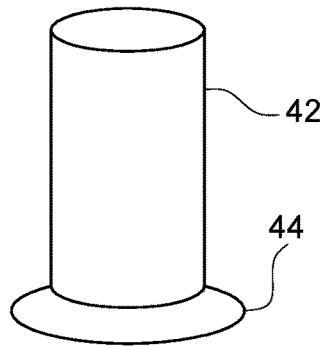
Figure 5:
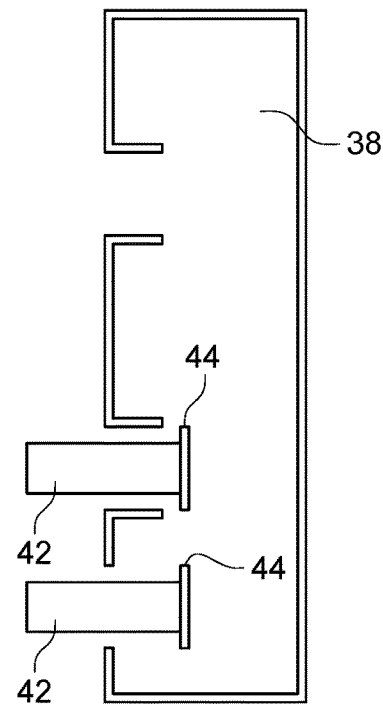
FIG. 5 is a cutaway view of the wall of a container with an accessory peg inserted into the hole in accordance with one or more embodiments of the invention.

Referring now to FIGS. 4 and 5. The accessory peg can comprise a shaft 42. The shaft 42 can have substantially the same diameter as the hole 18, or it can be smaller. The shaft 42 can be straight (FIG. 4a) or it can have a lip 44 (FIG. 4b). The lip can be distal to the face and can be compressible. The lip 44 can be of a slightly larger diameter than the diameter of the hole 18, making the accessory more secure on the container wall, but still removable.

Referring now to FIGS. 2a and 2b, the accessory face can be a multitude of decorative and/or useful items, shapes, sizes, and objects, such as a label or message holder, a sticker label, a writable label, a magnetic picture holder, a picture clip, letters, shapes, 2D objects, 3D objects, a saucer and the like. The accessory can have 1 peg, or it can have multiple pegs. In a particular embodiment, the accessory 20 can be another container 10. One container 10 may have at least one wall 13 having holes 18 and another wall having pegs 24. The pegs 24 of the wall 13 of one container 10 are configured to fit into the holes 18 of the wall 13 of another container 10. A single wall 13 of a given container 10 may have both holes 18 and pegs 24.

Figure 6A:
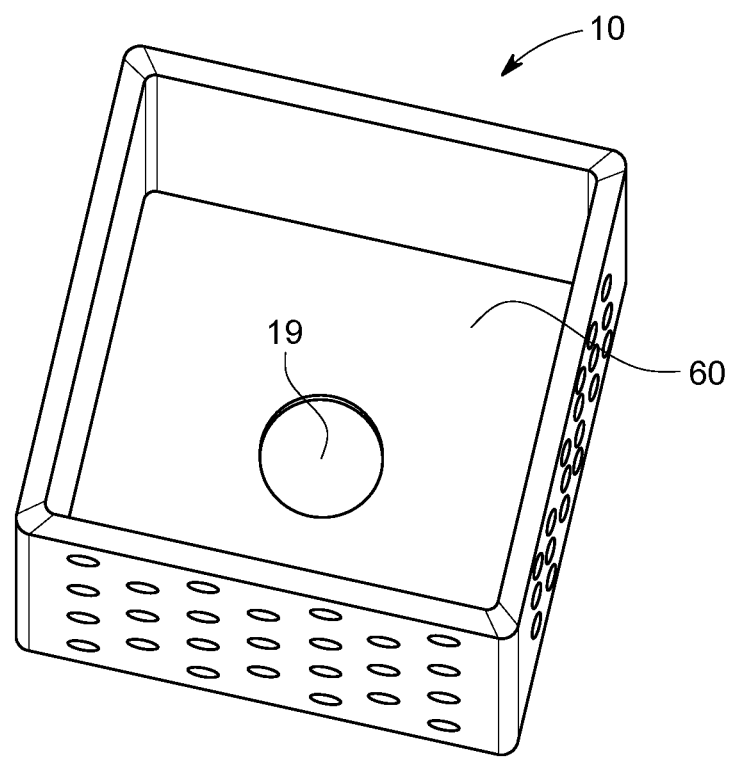
FIGS. 6a and 6b are perspective views of various containers in accordance with embodiments of the invention.
Figure 6B:
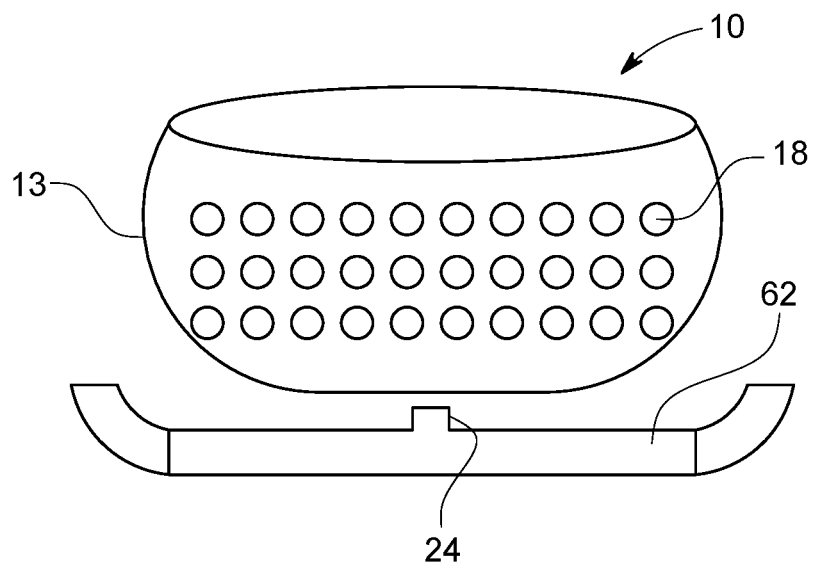
Figure 6C:
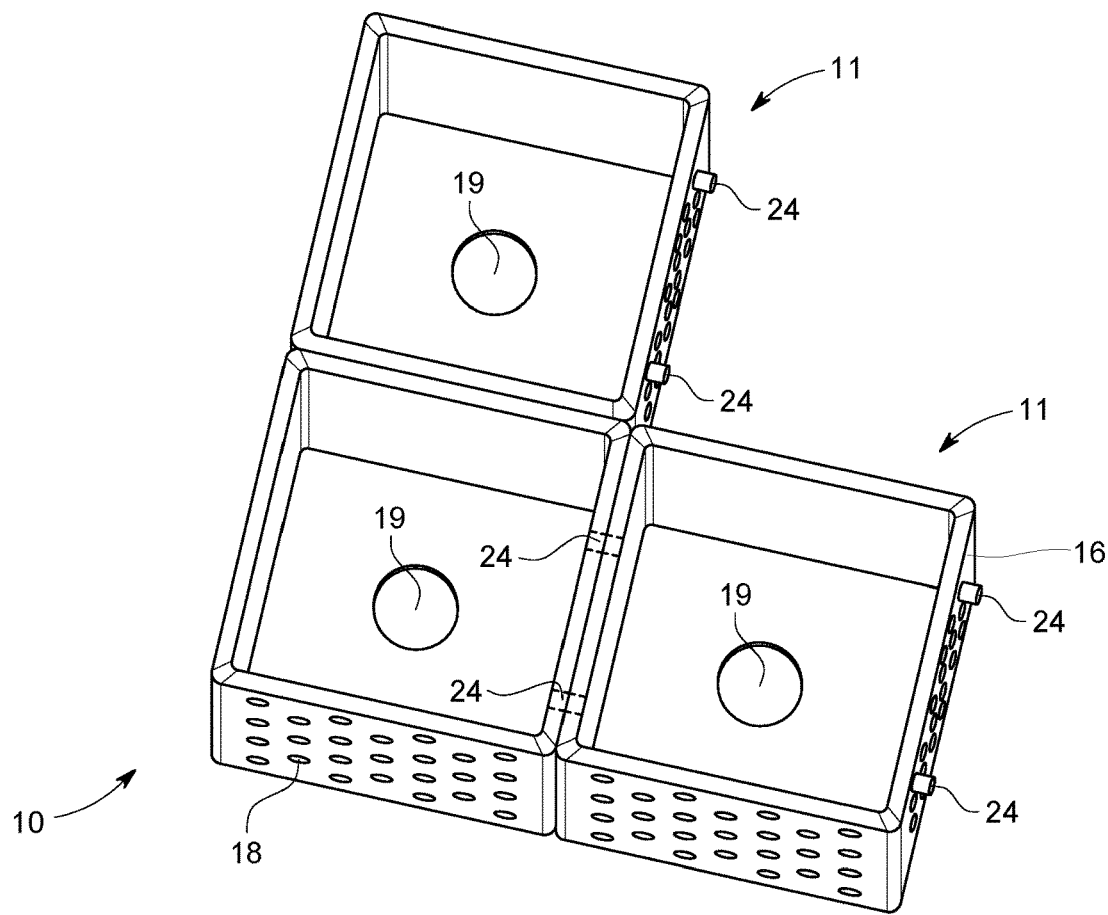
FIG. 6c a perspective view of multiple containers connecting as accessories in accordance with embodiments of the invention.
Figure 7:
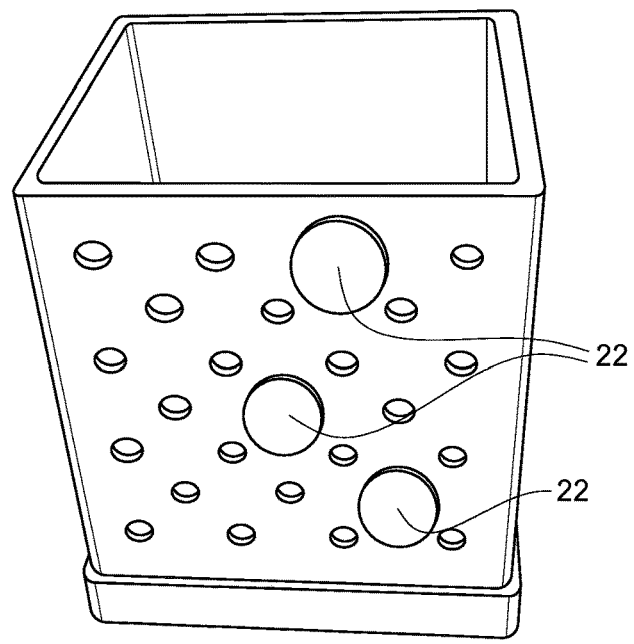
FIG. 7 is a perspective view of a container and accessories in accordance with one or more embodiments of the invention.
Figure 8:
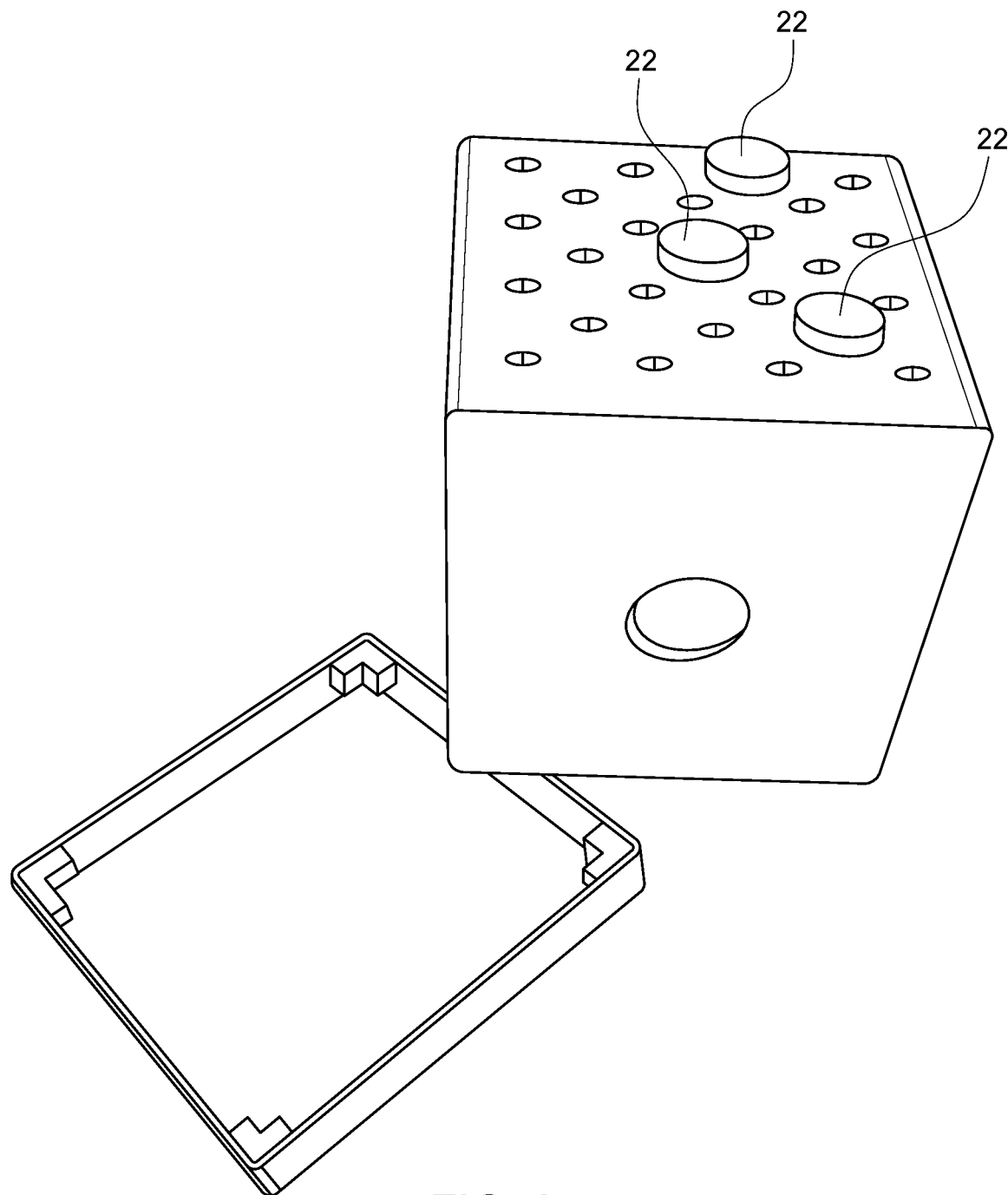
FIG. 8 is a perspective view of a container and accessories in accordance with one or more embodiments of the invention.

Referring now to FIG. 6a, The container can further comprise a bottom 60. The container bottom 60 can have one or more drains 19. Drains in the bottom are useful for draining liquid especially if the container is used for a plant pot since plants require that water drain out and away from the roots. Drains 19 are also useful for accepting accessories, especially if that accessory is a saucer 62 (FIG. 6b) or another container 10 (FIG. 6c). Stackable and/or attachable containers are especially useful in organizing other items, such as when used as a drawer organizer or the like. In these embodiments, a second container 11 would be considered the face 22 of the accessory 20. Multiple containers 10, 11 may be attached to each other to form a structure of connected containers. In a particular embodiment, the peg 24 couples to the base container 10 by inserting into a hole 18 and will also couple to the accessory container 11 by inserting into a hole 18 on a face 16 of the accessory container.

The plurality of holes 18 can make a grid-like pattern (FIG. 1). The grid-like pattern can have an outer perimeter, and the outer perimeter can have a desired shape, such as a wave), a circle, a square, a letter, and the like. The holes 18 can be confined to a certain area of the container, such as, in the case of a plant pot, above a soil line or they may be spread across the wall. The holes 18 and pegs 24 can be any shape, such as circular, triangular, square, hexagonal, octagonal, dodecagonal, slotted, tab, or the like.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only and is not intended to limit the scope of the present disclosure, which is defined solely by the claims. Accordingly, embodiments of the present disclosure are not limited to those precisely as shown and described.

Certain embodiments are described herein, including the best mode known to the inventors for carrying out the methods and devices described herein. Of course, variations on these described embodiments will become apparent to those of ordinary skill in the art upon reading the foregoing description. Accordingly, this disclosure includes all modifications and equivalents of the subject matter recited in the claims appended hereto as permitted by applicable law. Moreover, any combination of the above-described embodiments in all possible variations thereof is encompassed by the disclosure unless otherwise indicated herein or otherwise clearly contradicted by context.

What is claimed is:

1. A container and accessory system comprising:
   a container comprising a bottom and at least one wall defined by an interior surface and an exterior surface, wherein the exterior surface is comprised of at least one hole having a diameter, wherein the at least one wall is a hollow structure defined by the interior surface and exterior surface;
   an attachable accessory having a face and at least one peg sized to be insertable into the at least one hole.

2. The system of claim 1, wherein the at least one peg has a diameter and each of the at least one hole has an inner surface that is substantially the same diameter as the at least one peg.

3. The system of claim 1, wherein the at least one peg comprises a shaft portion coupled to the face and a compressible lip portion distal to the face, wherein the shaft portion has a shaft diameter that is approximately the diameter of each of the at least one hole and the lip portion has a lip diameter wherein the lip diameter is slightly larger than the diameter of each of the at least one hole.

4. The system of claim 1, wherein the wall is substantially solid between the interior surface and the exterior surface, and wherein the at least one hole has an inner surface that is substantially the same diameter as the at least one peg, and extends at least partially into the wall.

5. The system of claim 1, wherein the container is a box.

6. The system of claim 1, wherein the container is a plant pot.

7. The system of claim 1, wherein the container has at least one drain.

8. The system of claim 1, wherein the at least one hole is a plurality of holes arranged in a pattern.

9. The system of claim 8, wherein the pattern has an outer perimeter, and the outer perimeter has a desired shape.

10. The system of claim 1, wherein the shape of the at least one hole and the at least one peg are circular, triangular, square, hexagonal, octagonal, or dodecagonal.

11. The system of claim 1, wherein at least one of the at least one hole extends through the exterior surface and interior surface of the wall.

12. The system of claim 11, wherein the container has a soil line, and wherein the at least one hole are above the soil line.

13. The system of claim 1, wherein the attachable accessory further comprises a decorative layer that can be adhered to the face.

14. The system of claim 1, wherein the face is substantially flat.

15. A container and accessory system comprising:
   a container comprising a bottom and at least one wall defined by an interior surface and an exterior surface, wherein the exterior surface is comprised of at least one hole;
   an attachable accessory having a face and at least one peg sized to be insertable into the at least one hole;
   a decorative layer that can be adhered to the face wherein the decorative layer is an adhesive label that can be written on.

16. The system of claim 15, wherein the container is a plant pot.

17. The system of claim 15, wherein the at least one hole is a plurality of holes arranged in a pattern.

18. The system of claim 15, wherein the container has at least one drain.

* * * * *